United States Patent Office 3,557,133
Patented Jan. 19, 1971

3,557,133
THIADIAZOLINIUM CHLORIDES AND PROCESS
FOR THEIR PREPARATION
Hans Holtschmidt, Leverkusen-Steinbuchel, Gerhard
Zumach, Cologne-Stammheim, Fritz Döring, Odenthal-
Globusch, and Engelbert Kühle, Bergisch-Gladbach,
Germany, assignors to Farbenfabriken Bayer Aktien-
gesellschaft, Leverkusen, Germany, a corporation of
Germany
No Drawing. Filed Feb. 21, 1968, Ser. No. 707,327
Claims priority, application Germany, Mar. 25, 1967,
F 51,943
Int. Cl. C07d 91/60
U.S. Cl. 260—306.7                                  13 Claims

ABSTRACT OF THE DISCLOSURE

Reacting corresponding stoichiometric quantities of an isothiocyanate having the formula $R(NCS)_x$ and an isocyanate having the formula $R_1(NCO)_y$ in which R and $R_1$ each individually is alkyl, halogen-substituted alkyl, cycloalkyl, aralkyl, halogen-substituted aralkyl, aryl, or such aryl which is substituted with halogen, nitro, alkyl, halogenoalkyl, alkoxy and/or alkylmercapto, and $x$ and $y$ each is 1 or 2, with the stoichiometrically required quantity of a chlorination agent, e.g. chlorine or a compound which splits off chlorine, at about $-20$ to $+50°$ C., to form the corresponding thiadiazolinium chloride having the formula

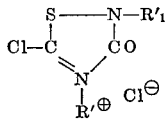

in which R' and $R'_1$ each individually is correspondingly the same as R and $R_1$, yet with the proviso that the alkyl and aryl radicals may be substituted with the corresponding thiadiazolinium chloride radical when $x$ and/or $y$ is 2; with optional hydrolysis to form the corresponding hydrolysis compounds; said thiadiazolinium chloride and corresponding hydrolysis compounds possessing herbicidal properties.

---

This invention relates to a process for the preparation of salt-type heterocyclic compounds and such compounds so produced.

It has been found that salt-type heterocyclic compounds are obtained by reacting the mixture of an isothiocyanate of the general formula:

$$R(NCS)_x \qquad (I)$$

in which R represents an alkyl radical which may be substituted by halogen atoms, a cycloalkyl radical, an aralkyl radical which may be substituted by halogen atoms, or an aryl radical which may be substituted, and $x$ denotes 1 or 2, and the stoichiometrically required quantity of an isocyanate in the temperature range of from about $-20°$ C. to about $50°$ C., if desired in the presence of an inert organic solvent, with the stoichiometrically required quantity of elementary chlorine or of a compound which gives off chlorine.

The optionally substituted alkyl radicals used are preferably those having from 1 to 18 carbon atoms; the halogens are preferably chlorine and bromine; suitable cycloalkyl radicals are especially those having 5 to 7 carbon atoms in the ring system; suitable aralkyl radicals which are optionally substiuted, preferably by chlorine or bromine, are especially those which contain from 1 to 4 carbon atoms in the aliphatic chain and the aromatic radical of which is preferably a phenyl or a naphthyl radical. Suitable optionally substituted aryl radicals are especially the phenyl radical and the naphthyl radical. Suitable substituents for the aryl radical are halogens (preferably chlorine and bromine), an alkyl group with from 1 to 12 carbon atoms, halogenoalkyl (preferably lower halogenoalkyl radicals, especially with chlorine and/or fluorine as the halogen, for example, trichloromethyl or trifluoromethyl), and suitable alkoxy and alkylmercapto radicals such as those having from 1 to 4 carbon atoms. Isothiocyanates used for the process according to the invention are known or may be obtained by known processes. Examples of such isothiocyanates are methyl isothiocyanate, ethyl isothiocyanate, cyclohexyl isothiocyanate, benzyl isothiocyanate, 2-chloroethylisothiocyanate, tertiary butyl isothiocyanate, phenylisothiocyanate, 4-chlorophenylisothiocyanate, 3,4 - dichlorophenylisothiocyanate, 4-trifluoromethylphenylisothiocyanate, 3-chloro-4-trifluoromethyl-phenyl-isothiocyanate, 3-methyl-4-chlorophenyl-isothiocyanate, 4-nitrophenyl-isothiocyanate, and 3-chloro-4 - methoxy-phenyl-isothiocyanate, 4 - methylmercapto - phenyl-isothiocyanate, 1 - naphthyl-isothiocyanate, hexamethylene-diisothiocyanate and p - phenylene - diisothiocyanate.

The isocyanates used for the process according to the invention are known (Liebig's Annalen der Chemie, 562, page 72 et seq. (1949)). For the preferred embodiment of the process according to the invention, isocyanates of the general formula:

$$R_1(NCO)_y \qquad (II)$$

in which $R_1$ has the same meaning as R but may be the same as or different from R and $y$ is 1 or 2, are used. Preferably the following are examples of such isocyanates: methylisocyanate, ethylisocyanate, dodecylisocyanate, i-propylisocyanate, 2-chloroethylisocyanate, cyclohexylisocyanate, benzylisocyanate, phenylisocyanate, 4-chlorophenylisocyanate, 4-bromophenylisocyanate, 3,4-dichlorophenylisocyanate, 4 - trifluoromethylphenylisocyanate, 3 - chloro - 4 - trifluoromethylphenylisocyanate, 4 - methoxyphenylisocyanate, 3 - chloro-4-methoxy-phenylisocyanate, 3-methyl - 4 - chlorophenylisocyanate, 4-methylmercaptophenylisocyanate, 1-naphthylisocyanate, hexamethylene-1,6-diisocyanate or p-phenylenediisocyanate. Monofunctional starting compounds are put into the reaction in the ratio of about 1:1. The quantities of isothiocyanate or isocyanate are generally so calculated that they amount to about two equivalents of a monofunctional isothiocyanate in cases where a polyfunctional compound, for example, a bifunctional isocyanate is used, and about two equivalents of a monofunctional isocyanate in cases where a bifunctional isothiocyanate is used. If desired polymer compounds may also be obtained, preferably by using a polyfunctional isocyanate and a polyfunctional isothiocyanate. The quantity of chlorine or of compound which gives off chlorine is so calculated that about 1 mol of chlorine is available for each of the NCS groups present.

It will be realized that the thiadiazolinium chlorides which are produced have the corresponding formula

The process will be explained with the aid of the example of the reaction of equivalent quantities of methyl isothiocyanate and the phenylisocyanate with chlorine.

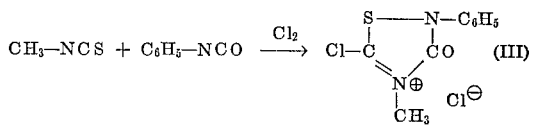  (III)

The reaction is generally carried out in a temperature range of from about −20° C. to about 50° C., preferably −5° C. to 8° C., if desired in the presence of an inert organic solvent. The reaction products are usually obtained in the form of insoluble, hygroscopic compounds in excellent yields. The chlorinating agent used for the process is preferably chlorine but compounds which split off chlorine, such as, for example, sulphuryl chloride, phosphorus pentachloride or phosgene may also be used. The inert organic solvent used may be any solvent which cannot be chlorinated under the reaction conditions, for example, methylene chloride, chloroform, carbon tetrachloride, chlorobenzene or dichlorobenzene.

It is distinctly surprising that the reaction proceeds definitely in the manner indicated without the formation of side-products since it is known that, for example, phenyl isocyanate is readily chlorinated in the p-position in the cold (Liebig's Annalen de Chamie 562, page 91 (1949)) and that aliphatic isocyanates will yield α-chlorinated products even at room temperature without the use of a catalyst (German Pat. No. 1,122,058).

It is also known that aliphatic isothiocyanates, e.g. methylisothiocyanate, very easily react with halogens to form insoluble compounds (Liebig's Annalen der Chemie, 285, pages 154, 166, 184 (1895)). It is thus all the more surprising that the process according to the invention works particularly well with aliphatic isothiocyanates.

The thiadiazolinium chlorides obtainable by the process according to the invention are valuable intermediate products for the preparation of auxiliary agents for synthetic resins and can also be used for the preparation of herbicidal compounds (German patent specifications Nos. F 49,254 IVd/12p and F51,360 IVd/12p, i.e. corresponding to copending U.S. applications Ser. No. 639,284, filed May 18, 1967, and Ser. No. 692,684, filed Dec. 22, 1967, now U.S. Pat. No. 3,491,109, respectively). They hydrolyse spontaneously with atmospheric moisture when simply left to stand. This reaction takes place according to the following equation which is given as an example:

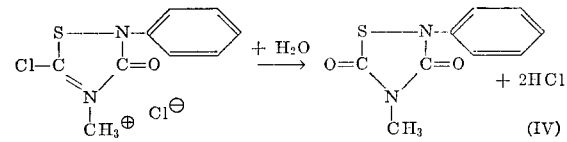

They can therefore be used directly as herbicidals. The hydrolysis may if desired be accelerated by stirring the product with water. The compounds obtained are then isolated in the usual manner and manifest a herbicidal action.

Application may be effected in customary manner, for example by watering, spraying, atomising, scattering or dusting.

The active compounds can be used according to the pre-emergence method, but are particularly effective when they are used according to the post-emergence method.

The concentration of active compound may vary within wide ranges. It is dependent on the weather conditions, on the purpose for which the active compound is used, and on the plants which are to be controlled or protected.

When the active compounds are used as total herbicide, the content of the active compound in the composition actually applied lies, in general between 0.1 and 2 percent by weight, preferably between 0.2 and 0.8 percent by weight. When the active compounds are used as selective herbicides, the content of active compound, is, in general, between 0.01 and 0.2 percent by weight, preferably between 0.03 and 0.1 percent by weight.

The following Examples A and B illustrate the herbicidal activity of the active compounds.

EXAMPLE A

Post-emergence test

Solvent: 5 parts by weight acetone
Emulsifier: 1 part by weight alkylaryl polygylcol ether To produce a suitable preparation of active compound, 1 part by weight of thiadiazoliniumchloride is mixed with the stated amount of solvent, the stated amount of emulsifier is added and the concentrate is then diluted with water to the desired concentration.

Test plants which have a height of about 5–15 cm. are sprayed with the preparation of the active compound until just dew moist. After three weeks, the degree of damage to the plants is determined and characterised by the values 0–5, which have the following meaning:

0 no effect
1 a few slightly burnt spots
2 marked damage to leaves
3 some leaves and parts of stalks partially dead
4 plant partially destroyed
5 plant completely dead The active compounds, their concentrations and the results obtained can be seen from the following table:

POST-EMERGENCE-TEST

| Active compound | Concentration of active compound in percent | Echinochloa | Chenopodium | Sinapis | Galinsoga | Stellaria | Urtica | Daucus | Matricaria | Oats | Cotton |
|---|---|---|---|---|---|---|---|---|---|---|---|
| 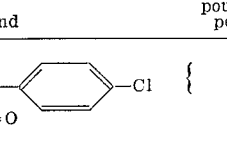—Cl | 0.1 / 0.05 | 5 / 5 | 5 / 5 | 5 / 5 | 5 / 5 | 5 / 5 | 5 / 5 | 4-5 / 3 | 5 / 5 | 1 / 0 | 1=2 / 0 |
| 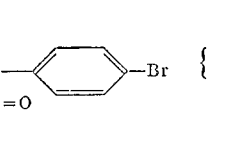—Br | 0.1 / 0.05 | 5 / 4 | 5 / 5 | 5 / 5 | 5 / 5 | 5 / 5 | 5 / 5 | 0 / 0 | 5 / 5 | 0 / 0 | 0 / 0 |
| 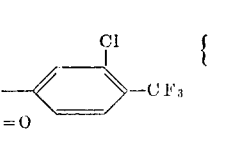 Cl, CF₃ | 0.1 / 0.05 | 5 / 5 | 5 / 5 | 5 / 5 | 5 / 5 | 5 / 5 | 5 / 5 | — | 5 / 5 | — | 4 / 3 |

EXAMPLE B

Pre-emergence test

Solvent: 5 parts of weight acetone
Emulsifier: 1 part by weight aralkyl polyglycol ether To produce a suitable preparation of active compound, 1 part by weight of thiadiazoliniumchloride is mixed with the stated amount of solvent, the stated amount of emulsifier is added and the concentrate is then diluted with water to the desired concentration.

Seeds of the test plants are sown in normal soil and, after 24 hours, watered with the preparation of the active compound. It is expedient to keep the amount of water per unit area. The concentration of the active compound in the preparation is of no importance, only the amount of active compound applied per unit area being decisive. After three weeks, the degree of damage to the test plants is determined and characterised by the values 0–5 which have the following meanings:

0 no effect
1 slight damage or delay in growth
2 marked damage or inhibition of growth
3 heavy damage and only deficient development or only 50% emerged
4 plants partially destroyed after germination or only 25% emerged
5 plants completely dead or not emerged The active compounds, the amounts applied and the results obtained can be seen from the following table:

Also the other thiadiazoliniumchlorides obtainable according to the process of the invention show a similar activity, independent of whether applied as salts or prehydrolyzed.

The invention is illustrated by the following examples:

EXAMPLE 1

71 g. (1 mol) of chlorine are introduced at from −5° C. to 0° C., into a mixture of 73 g. of methylisothiocyanate (1 mol) and 119 g. (1 mol) of phenylisocyanate in 1 litre of carbon tetrachloride. Precipitation soon sets in, which increases progressively in the course of the reaction. After the chlorine has been introduced, the reaction mixture is stirred for a further 30 minutes at room temperature and the precipitate is separated by suction filtration and washed with ether. 250 g. (95% of the theoretical) of 5-chloro-4-methyl-2-phenyl-3-oxo-1,2,4-thiadiazolinium chloride of the formula:

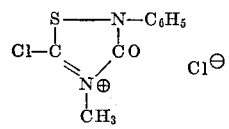

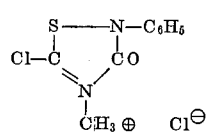

are obtained. Colourless hygroscopic crystals of M.P. 109–111° C.

PRE-EMERGENCE TEST

| Active compound | Amount of active compound in kg./hectare | Chenopodium | Sinapis | Cotton | Oats | Wheat |
|---|---|---|---|---|---|---|
| 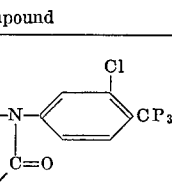 | 10<br>5<br>2,5 | 5<br>5<br>5 | 5<br>5<br>4 | | 2<br>1<br>0 | 1<br>0<br>0 |
| 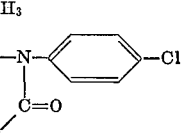 | 20<br>10<br>5 | 5<br>5<br>5 | | 1<br>0<br>0 | | 5<br>4–5<br>4 |
| 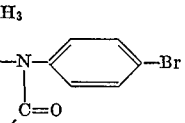 | 20<br>10<br>5 | 5<br>5<br>4–5 | | 2<br>1<br>0 | | 4–5<br>4 |

The following compounds are obtained in the same way as indicated in the above example:

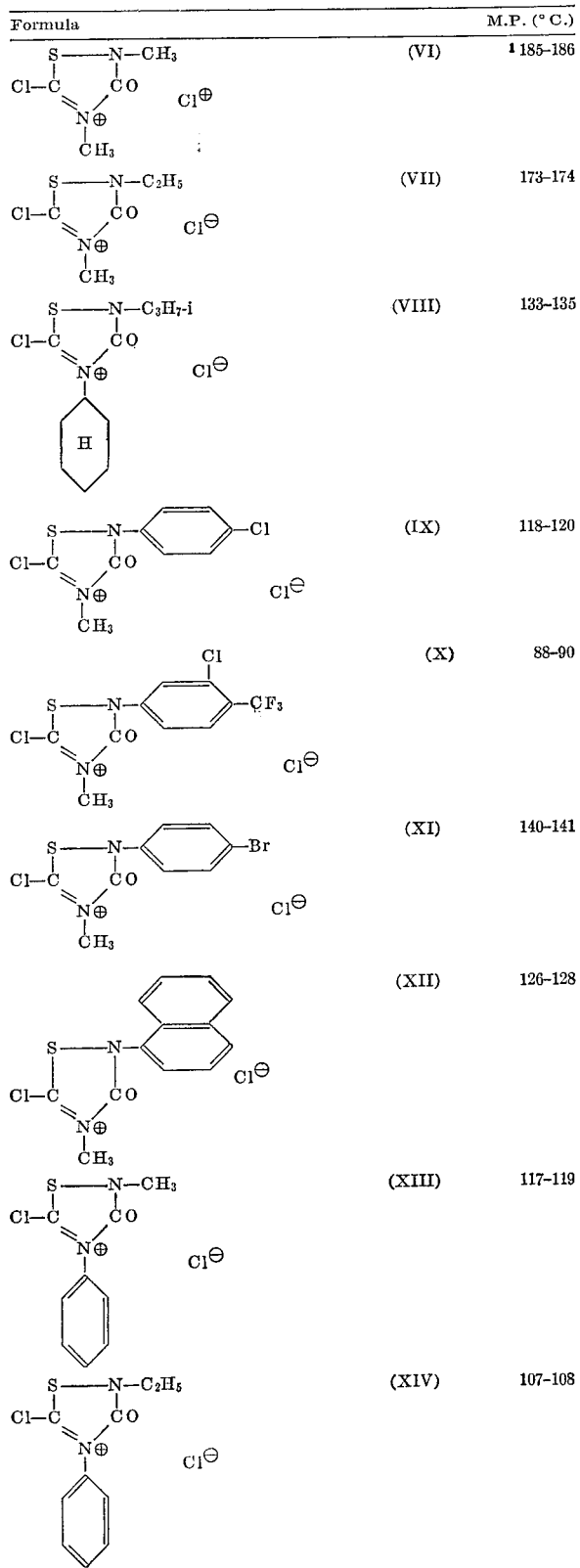

| Formula | | M.P. (° C.) |
|---|---|---|
| (VI) | | [1] 185–186 |
| (VII) | | 173–174 |
| (VIII) | | 133–135 |
| (IX) | | 118–120 |
| (X) | | 88–90 |
| (XI) | | 140–141 |
| (XII) | | 126–128 |
| (XIII) | | 117–119 |
| (XIV) | | 107–108 |

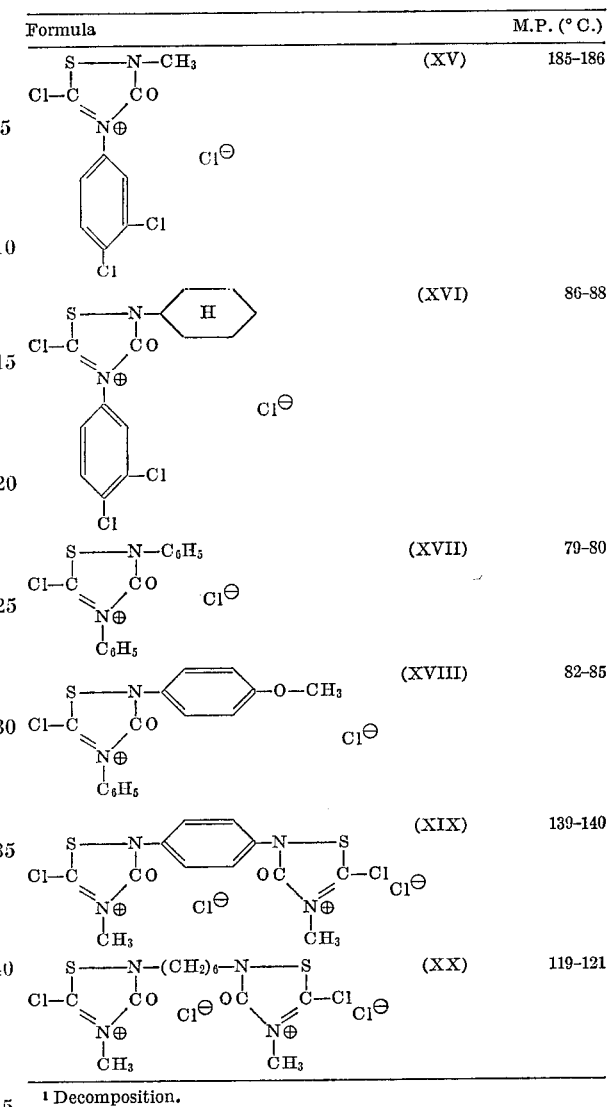

| Formula | | M.P. (° C.) |
|---|---|---|
| (XV) | | 185–186 |
| (XVI) | | 86–88 |
| (XVII) | | 79–80 |
| (XVIII) | | 82–85 |
| (XIX) | | 139–140 |
| (XX) | | 119–121 |

[1] Decomposition.

EXAMPLE 2

40.5 g. of sulphuryl chloride (0.3 mol) are added dropwise at 0–5° C. to a mixture of 22 g. of methylisothiocyanate (0.3 mol) and 56 g. of 3,4-dichlorophenyl-isocyanate (0.3 mol) in 500 cc. of carbon tetrachloride. After the addition of sulphuryl chloride, the reaction mixture is stirred for a further 30 minutes at room temperature and the precipitated product is separated by suction filtration and washed with ether. 5-chloro-2-(3′,4′-dichlorophenyl)-4-methyl - 3 - oxo-1,2,4-thiadiazolinium chloride of the formula:

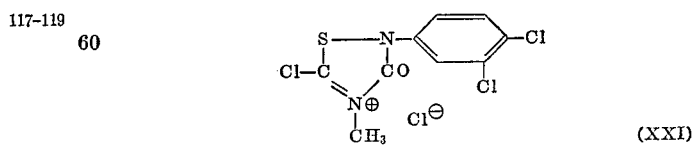

(XXI)

is obtained in quantitative yield. Colourless, hygroscopic crystals, M.P. 113–114° C.

EXAMPLE 3

27 g. of p-phenylendiisothiocyanate and 23 g. of hexamethylene diisocyanate are dissolved in 300 cc. of chloroform, and 20 g. of chlorine are introduced at 0° C. 56 g. of a high molecular weight, transparent synthetic resin separate out in the process. It is insoluble in chloroform and sparingly soluble in dioxane.

What we claim is:

1. Process for the preparation of thiadiazolinium chlorides having the formula

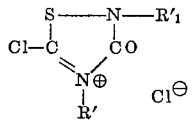

in which R' and R'$_1$ each individually is a member selected from the group consisting of C$_{1-18}$ alkyl, halogen-substituted C$_{1-18}$ alkyl, C$_{5-7}$ cycloalkyl, phenyl-C$_{1-4}$ alkyl, naphthyl-C$_{1-4}$ alkyl, halogen-substituted phenyl-C$_{1-4}$ alkyl, halogen-substituted naphthyl-C$_{1-4}$ alkyl, phenyl, naphthyl, such phenyl and naphthyl which is substituted with substituents selected from the group consisting of halogen, nitro, C$_{1-12}$ alkyl, halogeno-lower alkyl, C$_{1-4}$ alkoxy, C$_{1-4}$ alkylmercapto, and mixtures of such substituents, and such C$_{1-18}$ alkyl and phenyl which is substituted with the corresponding thiadiazolinium chloride radical, which comprises reacting a mixture of the corresponding stoichiometric quantities of an isothiocyanate having the formula R(NCS)$_x$ and an isocyanate having the formula R$_1$(NCO)$_y$ in which R and R$_1$ each individually is correspondingly selected from the group consisting of C$_{1-18}$ alkyl, halogen-substituted C$_{1-18}$ alkyl, C$_{5-7}$ cycloalkyl, phenyl-C$_{1-4}$ alkyl, naphthyl-C$_{1-4}$ alkyl, halogen-substituted phenyl-C$_{1-4}$ alkyl, halogen-substituted naphthyl-C$_{1-4}$ alkyl, phenyl, naphthyl, and such phenyl and naphthyl which is substituted with substituents selected from the group consisting of halogen, nitro, C$_{1-12}$ alkyl, halogeno-lower alkyl, C$_{1-4}$ alkoxy, C$_{1-4}$ alkylmercapto, and mixtures of such substituents, $x$ is 1–2, and $y$ is 1–2, with the stoichiometrically required quantity of a chlorination agent selected from the group consisting of chlorine and a compound which splits off chlorine, at a temperature substantially between about −20 to +50° C., whereby to form the corresponding thiadiazolinium chloride.

2. Process according to claim 1 wherein the reaction is carried out in the presence of an inert organic solvent.

3. Process according to claim 1 wherein about one mol of chlorine is present per NCS group present.

4. Process according to claim 1 wherein said chlorination agent is selected from the group consisting of sulfuryl chloride, phosphorus pentachloride, phosgene and chloride.

5. Process according to claim 1 wherein said temperature is between about −5 to +8° C.

6. Process according to claim 1 wherein $x$ and $y$ each is 1 and said isothiocyanate and isocyanate are used in a ratio of 1:1, one mole of chlorine being present per NCS group present.

7. Process according to claim 1 wherein R and R$_1$ each individually is selected from the group consisting of C$_{1-18}$ alkyl, chloro-substituted C$_{1-18}$ alkyl, cyclohexyl, benzyl, phenyl, naphthyl, and such phenyl which is substituted with substituents selected from the group consisting of chloro, bromo, nitro, C$_{1-12}$ alkyl, trifluoromethyl, C$_{1-4}$ alkoxy, C$_{1-4}$ alkylmercapto, and mixtures of such substituents, and wherein correspondingly R' and R'$_1$ each individually is selected from the group consisting of R and R$_1$ as defined above, and such C$_{1-18}$ alkyl and phenyl which are substituted with the corresponding thiadiazolinum chloride radical when at least one of $x$ and $y$ is 2.

8. Thiadiazolinum chloride having the formula

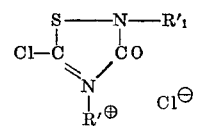

in which R' and R'$_1$ each individually is a member selected from the group consisting of C$_{1-18}$ alkyl, halogen-substituted C$_{1-18}$ alkyl, C$_{5-7}$ cycloalkyl, phenyl-C$_{1-4}$ alkyl, naphthyl-C$_{1-4}$ alkyl, halogen-substituted phenyl-C$_{1-4}$ alkyl, halogen-substituted naphthyl-C$_{1-4}$ alkyl, phenyl, naphthyl, such phenyl and naphthyl which is substituted with substituents selected from the group consisting of halogen, nitro, C$_{1-12}$ alkyl, halogeno-lower alkyl, C$_{1-4}$ alkoxy, C$_{1-4}$ alkylmercapto, and mixtures of such substituents, and such C$_{1-18}$ alkyl and phenyl which is substituted with the corresponding thiadiazolinium chloride radical.

9. Compound according to claim 8 wherein R' and R'$_1$ each individually is selected from the group consisting of C$_{1-18}$ alkyl, chloro-substituted C$_{1-18}$ alkyl, cyclohexyl, benzyl, phenyl, naphthyl, and such phenyl which is substituted with substituents selected from the group consisting of chloro, bromo, nitro, C$_{1-12}$ alkyl, trifluoromethyl, C$_{1-4}$ alkoxy, C$_{1-4}$ alkylmercapto, and mixtures of such substituents, and such C$_{1-18}$ alkyl and phenyl which are substituted with the corresponding thiadiazolinium chloride radical when at least one of $x$ and $y$ is 2.

10. Thiadiazolinium chloride having the formula

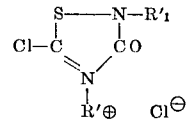

in which R' is methyl and R'$_1$ is a member selected from the group consisting of phenyl, para-chloro-phenyl, para-bromophenyl, meta-chloro - para - trifluoromethyl-phenyl, methyl, ethyl, naphthyl, the moiety of the formula

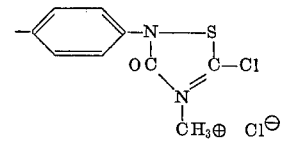

the moiety of the formula

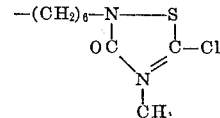

and meta,para-dichloro-phenyl.

11. The compound of the formula

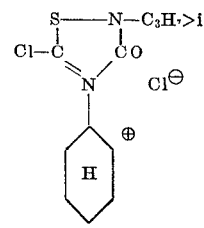

12. Thiadiazolinium chloride having the formula

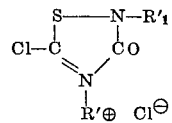

in which R' is phenyl and R'$_1$ is a member selected from the group consisting of methyl, ethyl, phenyl and para-methoxy-phenyl.

13. Thiadiazolinium chloride having the formula
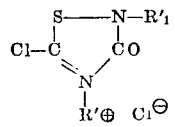
in which R' is meta,para-dichloro-phenyl and R'₁ is a member selected from the group consisting of methyl and cyclohexyl.
References Cited
UNITED STATES PATENTS
3,287,466  11/1966  Klopping ......... 260—306.7
3,287,467  11/1966  Gerjovich ........ 260—306.7
ALEX MAZEL, Primary Examiner
R. J. GALLAGHER, Assistant Examiner
U.S. Cl. X.R.
71—90; 260—453, 454